United States Patent

Patel et al.

[11] Patent Number: 5,886,306
[45] Date of Patent: Mar. 23, 1999

[54] LAYERED ACOUSTICAL INSULATING WEB

[75] Inventors: Kirit Patel, Bensalem, Pa.; Gulshan Chhabra, Roselle, N.J.

[73] Assignee: KG Fibers, Inc., Palmyra, N.J.

[21] Appl. No.: 898,061

[22] Filed: Jul. 22, 1997

[51] Int. Cl.⁶ ........................................ E04B 1/82
[52] U.S. Cl. ................ 181/290; 181/294; 428/297.1
[58] Field of Search ................................ 181/284, 286, 181/290, 291, 294, 295; 428/903, 255, 297.1, 298.4, 298.1

[56] References Cited

U.S. PATENT DOCUMENTS

| | | |
|---|---|---|
| T100,902 | 8/1981 | Hauser . |
| 4,041,203 | 8/1977 | Brock et al. . |
| 4,302,344 | 11/1981 | Ruff et al. . |
| 4,379,192 | 4/1983 | Wahlquist et al. . |
| 4,420,526 | 12/1983 | Schilling et al. . |
| 4,806,190 | 2/1989 | Sorenson ................... 156/161 |
| 4,828,910 | 5/1989 | Haussling . |
| 4,840,832 | 6/1989 | Weinle et al. . |
| 4,851,283 | 7/1989 | Holtrop et al. . |
| 4,927,705 | 5/1990 | Syme . |
| 5,049,439 | 9/1991 | Robinson ................... 428/286 |
| 5,057,168 | 10/1991 | Muncrief . |
| 5,073,436 | 12/1991 | Antonacci et al. . |
| 5,139,841 | 8/1992 | Makoui et al. ............ 428/286 |
| 5,246,772 | 9/1993 | Manning ................... 428/286 |
| 5,298,694 | 3/1994 | Thompson et al. . |
| 5,443,893 | 8/1995 | Herzberg . |
| 5,491,186 | 2/1996 | Kean et al. . |
| 5,516,580 | 5/1996 | Frenette et al. . |
| 5,545,453 | 8/1996 | Grant . |

Primary Examiner—Khanh Dang
Attorney, Agent, or Firm—Lucas & Just

[57] ABSTRACT

An acoustical web for use with vehicles, farm equipment, airplanes and trains is disclosed. The web has a plurality of layers of cellulose bonded with a binder.

18 Claims, 3 Drawing Sheets

LAYERED ACOUSTICAL INSULATING WEB

This invention relates generally to an acoustical web. It is more particularly useful in the transportation industry, e.g. for use in vehicles, farm equipment, airplanes and trains. It can also be used in appliances and in architectural applications. The invention also relates to the process of making such acoustical webs.

DESCRIPTION OF THE RELATED ART

In recent years, noise problems have become very prevalent and difficult to overcome within office buildings, vehicles, appliances and ventilation duct work. Acoustical insulation is a requirement in many areas, e.g. vehicle doors, office paneling, appliances, etc.

The acoustical insulation normally absorbs the incoming sound waves and, to a certain extent, it reflects the sound waves striking the pad away from the insulated article. The choice of sound insulating materials includes felts, foams, compressed fibers, rock wool and recycled textile fibers mat.

In addition to having good sound absorption efficiencies, automotive acoustical insulators should be as light as possible so as not to contribute to the overall weight of the vehicle. Modern vehicle doors, which are made to be aerodynamically efficient, require thin, light, low cost and effective acoustical insulators. Consumers are demanding more and more quiet cars for the 1990's.

The new trend is towards hydrophobic, microfiber web for such applications. The choice of a particular sound insulating material for a given application is determined by not only acoustical characteristics, but the cost, weight, thickness, compression recovery and fire retardancy. There are several patents, e.g. U.S. Pat. No. 4,469,732 (Isaksen) which disclose a water deflector in a door panel construction. U.S. Pat. No. 5,298,694 (Thompson) describes a microfiber mat using melt-blown, solution-blown and cross-lapped needle punched fine denier fiber mat for such applications. The drawback to such processes is that the cost of the materials is very high due to the high energy costs and initial capital investment required for carrying out these processes.

For the foregoing reasons, there is a need for an improved, low cost and low density acoustical material.

SUMMARY OF THE INVENTION

The present invention relates to the manufacture and use of nonwoven acoustical insulation webs for use in vehicles, airplanes, trains, appliances, sound reproduction systems and architectural applications.

There are three basic areas to examine when confronting noise problems: noise source, noise path and noise receiver. Since noise radiates from a source, it is easier to choose machinery that is quiet to begin with. But often the machinery or process can't be quieted. Adding acoustical materials to noise generating surfaces may help reduce the noise. The materials used may be sound absorbing, sound blocking or damping.

Noise is transmitted via sound waves through the space that separates the source from the receiver. Changing the path of this transmission to reduce the acoustical energy that reaches the receiver is effective noise control. This means impeding the sound transmission by interfering with reflected and direct paths.

Reflected noise paths can be reduced by adding sound absorbing panels to walls or car doors, dishwasher doors, etc. There are three types of noise control materials available to help solve noise problems:

1. Noise barriers are used to block the noise. These do not absorb, dissipate or deaden noise. The essential physical characteristic is mass.
2. Noise absorbers dissipate noise since they do not block or reflect noise. The essential physical characteristic of a noise absorber is an open fibrous or cellular structure. Lower density and finer fibers will provide excellent sound absorbing capabilities. The resulting mechanical movement of the strands dissipates the energy which is released as heat.
3. Damping materials are used to reduce radiated noise. A viscous elastic material is applied directly to the surface of the vibrating structure and converts the vibrational energy to heat. The flexing of the damping material provides the energy dissipation to reduce noise.

The principal acoustical measure of sound absorbing materials is the sound absorption coefficient. It is measured using the ASTM E1050 Dual Microphone Impedance Tube Method and, when multiplied by 100, is a percentage measure of the material's ability to absorb sound. The value most frequently stated as noise reduction coefficient (NRC).

The present invention relates to acoustic webs comprising layers of cellulose fibers (pulp fiber with fiber dia range aspect ratio), particularly bleached wood pulp having longer fibers, bonded with a starch or latex binder.

The acoustical web may comprise layers of 100% bleached wood pulp blended with a low formaldehyde latex resin. It can be treated with fire retardant, mildew inhibitors and water repellents during the sandwich construction. The layers are suitably sprayed with waterproofing and fire retardant chemicals before drying. Drying is suitably accomplished by passing through an oven or a series of infrared heaters. In another embodiment, the cellulose fiber may comprise about 95% to about 80% by weight wood pulp fiber and about 5% to about 20% synthetic fiber. Any conventional synthetic fiber may be included.

Alternatively, the acoustical web may be made by bonding of either Rando air-laid pulp fibers or three to four layers of all cellulose bleached pulp roll goods. The bonding is accomplished by passing the layers through a saturator containing starch or a latex based binder. Waterproofing and fire retardant chemicals may be applied at the same time, if desired. After going through the saturator, the web goes through nip rolls, where the excess binder is squeezed out. The compressed web then goes through a dryer to remove the remaining moisture.

The web may contain a top layer of lightweight microfiber melt-blown web and a bottom layer of spunbond web to enhance water repellency and to improve product handleability and to improve acoustical properties. The web is preferably a lightweight, with the core of all cellulose fibers treated with fire retardants and mildew inhibitors. The laminate can suitably be applied to the inner panel of a vehicle door with a second layer of film or foil laminated thereto.

Off-spec or overrun cellulose roll goods are suitable for use in the present invention. They can be obtained from Merfin, Canada; Kimberly-Clark; or Scott Paper Co. The roll goods of these cellulose fibers can suitably be mounted on three to four unwind stands, depending upon the application and the final thickness and the desired acoustical properties. Each layer of material is treated with a binder, such as starch, latex or thermoplastic powder, and may also be treated with a water repellent, a mildew inhibitor and a fire retardant. A top layer of lightweight melt-blown or spunbond synthetic fibers can also be included. The layers are pressed to bond them together and squeeze out excess binder. They are then dried, suitably by a flowthrough dryer or a bank of infrared heaters.

Another aspect of the present invention is to laminate polyfilm, foil or paper onto the cellulose web to prevent sound and water from entering a vehicle interior.

A further aspect to this invention is to prepare the web by air-laying the ground-up pulp fibers via a Rando-type air lay machine, applying top and bottom layers of either cellutissue (paper), melt-blown or spunbond, passing the composite product through a binder saturator and then drying. Thermoplastic synthetic fibers can be blended with the cellulose pulp fibers to improve loft, reduce dusting and increase resiliency of the composite product.

DETAILED DESCRIPTION OF ILLUSTRATIVE EMBODIMENTS

The present invention relates to a method of making a layered acoustical nonwoven web to use in noise reduction applications. The layered acoustical nonwoven web can be composed of all cellulose core material with a facing of lightweight melt-blown polypropylene (2–4 oz/sq.yd), spunbond polypropylene (0.5–1.00 oz/sq.yd), carded polyester-rayon nonwoven fabric with water repellency treatment, foil or film such as thermoplastic film.

The cellulose web may be formed by typical paper making processes, such as the air-laid process. The fibers are bonded, suitably with a latex or starch binder. A Rando-type air-laid machine can also be used, after which the web is passed through a saturator, squeezed between nip rolls, and then dried. The roll goods are suitably bought as off-spec, overruns or virgin rolls for further treatment and bonding. Typical paper roll goods made out of bleached fibers have a fiber diameter of about 25 microns to about 35 microns.

A suitable starch binder formulation consists of Thin Boiling Starch 250B ADM with a binder solids of 4 to 11%. A non-ionic water repellent at 1–2%, suitably Amguard XP-122167-A, supplied by American Emulsions, Dalton, Ga.; a wax emulsion at 1–2%, such as WW-1971-D from H. B. Fuller, Vadnais Height, Minn.; an antibacterial at 0.05%, such as Dearcide CL-2150 from Chemtreat, Inc., Richmond, Va. or Novo Nordisk BAN 120L, Danbury, Conn.; a fire retardant inorganic salt like ammonium sulfate; boric acid; or a mixture of borate at 4–7% can be sprayed on each layer. The layers are lightly compressed to maintain the original thickness of the paper rolls. The pressed layered product is then passed through a dryer.

A typical latex binder formulation includes vinyl acetate monomer, such as PD-0062 from H. B. Fuller, or carboxylated styrene-acrylic copolymer, such as PD-0410 or 0400 from H. B. Fuller. A proprietary synthetic resin, XR1960 M from H. B. Fuller with a latex solids range from 7–14%, can also be used. Fire retardant and water repellent chemicals can also be added.

The weight of each layer of paper (ply) can vary from about 45 to about 105 g/sq.yd. The final weight of the finish layered web will suitably be about 250–1050 grams/sq.yd depending upon desired end use. A preferred acoustical layered product will weigh about 300–400 grams/sq.yd without water deflector film. The thickness can suitably vary from 0.20 to 0.75 inches. The layers can also be laminated with sound barrier materials like Keldax-DuPont (EVA with 70% filled inert materials from DuPont) or regrind PVC filled with silica.

BRIEF DESCRIPTION OF THE DRAWINGS

These and other aspects of the present invention may be more fully understood with reference to the figures wherein.

DETAILED DESCRIPTION OF THE DRAWINGS

Figure 1:
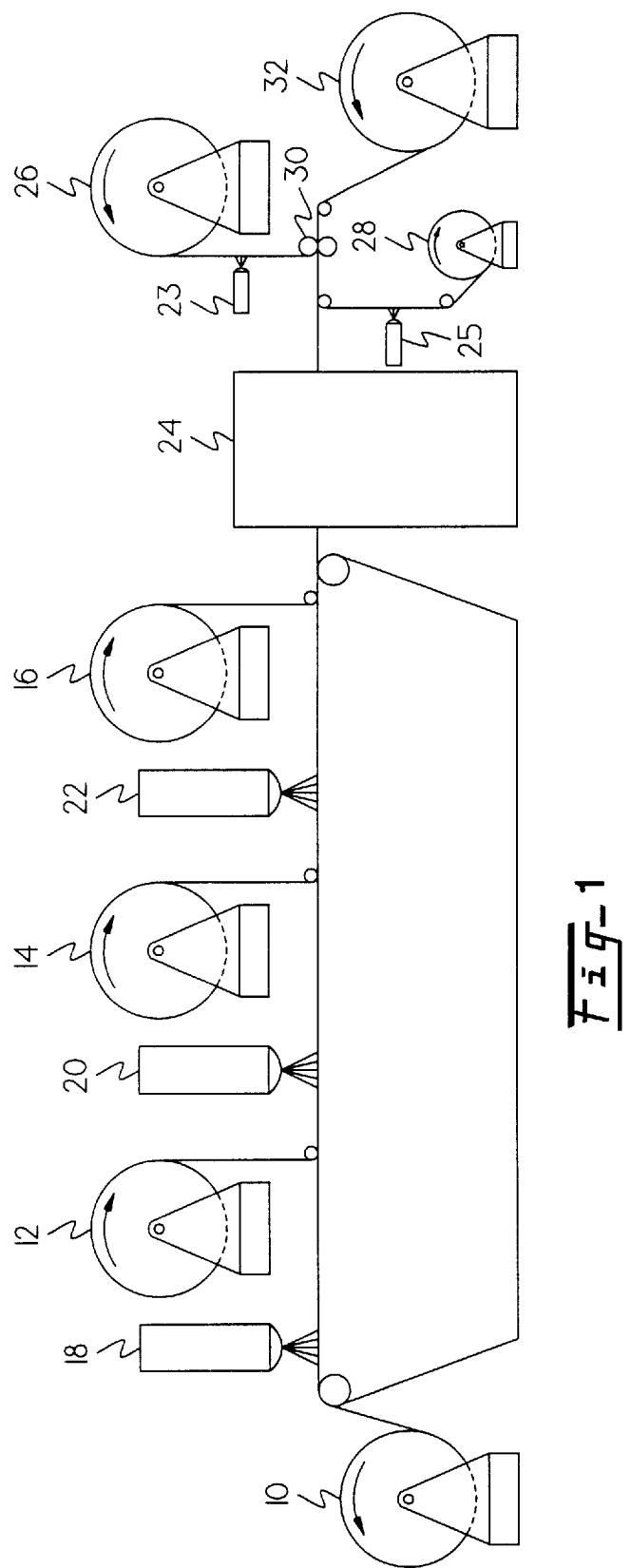
FIG. 1 shows a suitable apparatus for laying up consecutive layers of materials according to the present invention.

Referring first to FIG. 1, there are a series 10, 12, 14, 16 of rolls of material, preferably cellulose fiber. There can be anywhere from two to five rolls of material, but preferably three or four are used. Binder spray nozzles 18, 20, 22 apply spray between successive layers of the web. It will be appreciated that the number of binder spray nozzles will always be one less than the number of rolls of cellulose material. After the binder is applied, the bonded layers pass through a dryer 24. Thereafter, one or more additional layers of material may be applied. The additional layers may be adhesively bonded by means of adhesive applicators 23 and 25. Top layer 26 is suitably melt-blown or spunbond thermoplastic fiber such as polypropylene. Bottom layer 28 can suitably be film, foil, paper or spunbond thermoplastic fibers. The composite laminate passes through a pair of nip rolls 30, after which it is wound onto a wind-up roll 32.

It will be appreciated that various chemicals, such as fire retardants, mildew inhibitors, water repellents and the like, can be included in one or more of the binder solutions supplied by binder spray nozzles 18, 20 and 22.

Figure 2:
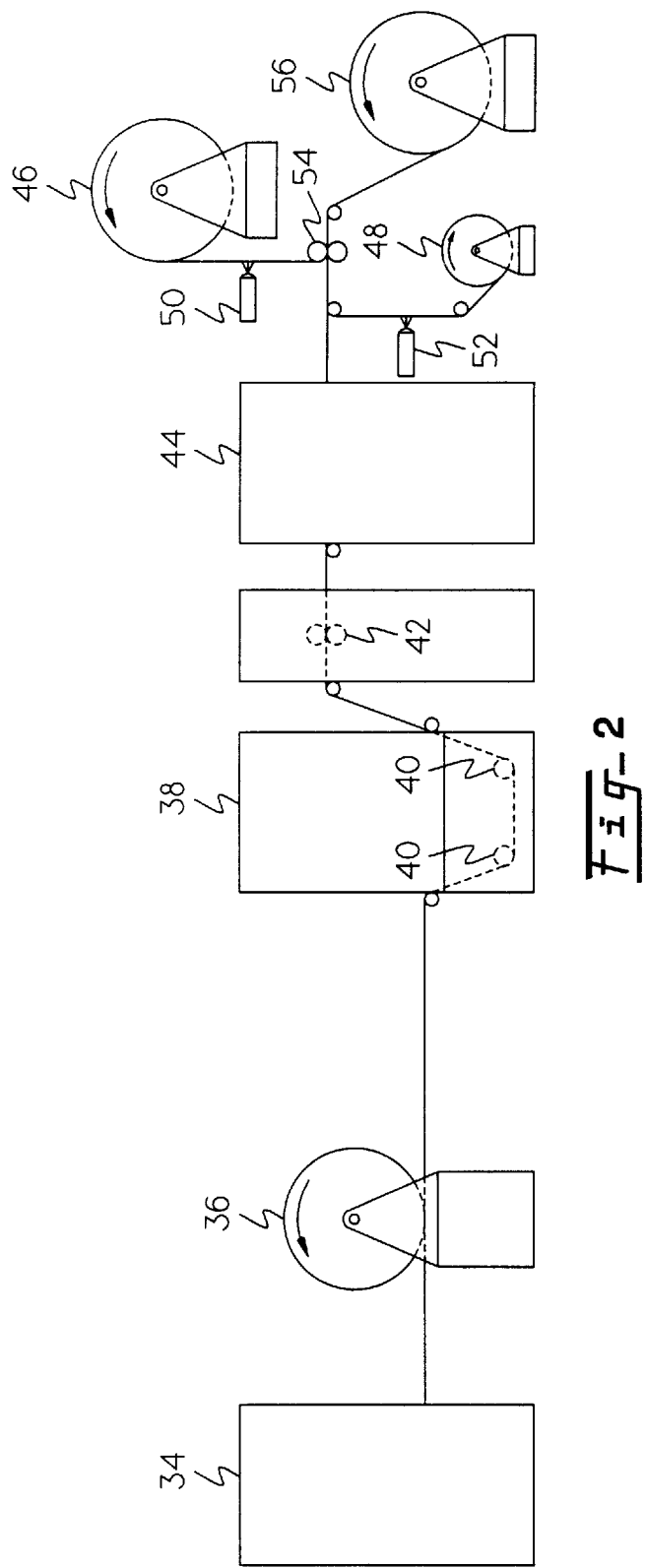
FIG. 2 shows a suitable process for air-laying fibers in accordance with the present invention.

Referring now to FIG. 2, a mat is air-laid in conventional manner in machine 34, suitably a Rando machine. One or more layers of cellulose mat are then applied from roll 36. The composite structure is passed through a saturator 38 by means of guide rolls 40. The structure contains a starch or latex based binder and may also contain additional chemicals such as fire retardants, water repellents and mildew inhibitors. The structured product passes through nip rolls 42, after which it goes through a dryer 44. The dryer can be an oven or a series of infrared heaters. As with FIG. 1, both top 46 and bottom 48 layers can be applied and, as with FIG. 1, adhesive applicators 50, 52 can be used for any added layers. Thereafter, as in FIG. 1, the laminate passes through nip rolls 54 and onto winder 56.

Figure 3:
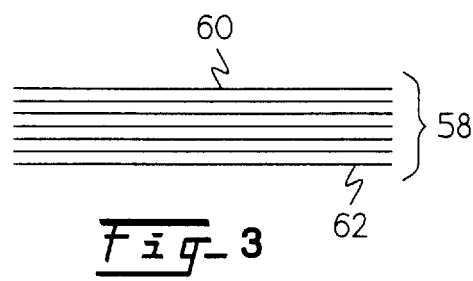
FIG. 3 shows a suitable finished product in accordance with the present invention.

In FIG. 3 there is shown a product made in accordance with the present invention. It comprises a series of layers 58 of cellulose fiber with a top layer 60 and a bottom layer 62 adhered thereto.

The nonwoven acoustical insulation web discussed above can further comprise a top and bottom layer laminated thereto on the front end as shown in FIG. 1. In a preferred embodiment, the invention relates to a laminate in FIG. 3 with number of layers of cellulose fibers will vary from 2–5.

The layered product with or without film or barrier material can then be die-cut to shape. To allow the layered product to be attached to the door or any surface, the film further can be treated with a layer of adhesive to selected areas or Velcro-type attachment on the film side will help to install such material on different surfaces.

EXAMPLES

In Examples 1–4, webs were prepared using starch binder with 6 mil. (150 microns) polyethylene film on one side. The sound absorption tested according to ASTM E-1050 using a Bruel & Kjaer, Model #4206, Two-microphone Impedance Measurement Tube to measure normal incidence sound absorption coefficient (alpha). The method as per ASTM E1050 uses a tube, two microphones and a Digital Frequency Analysis System. Table 1 reports the data for a 100 mm tube while Table 2 reports the data for a 29 mm tube.

The normal incidence sound wave facing the film for Examples 1–3 and facing the melt-blown for Example 4. The polyfilm lamination takes place using hot melt adhesive laminator.

Figure 4:
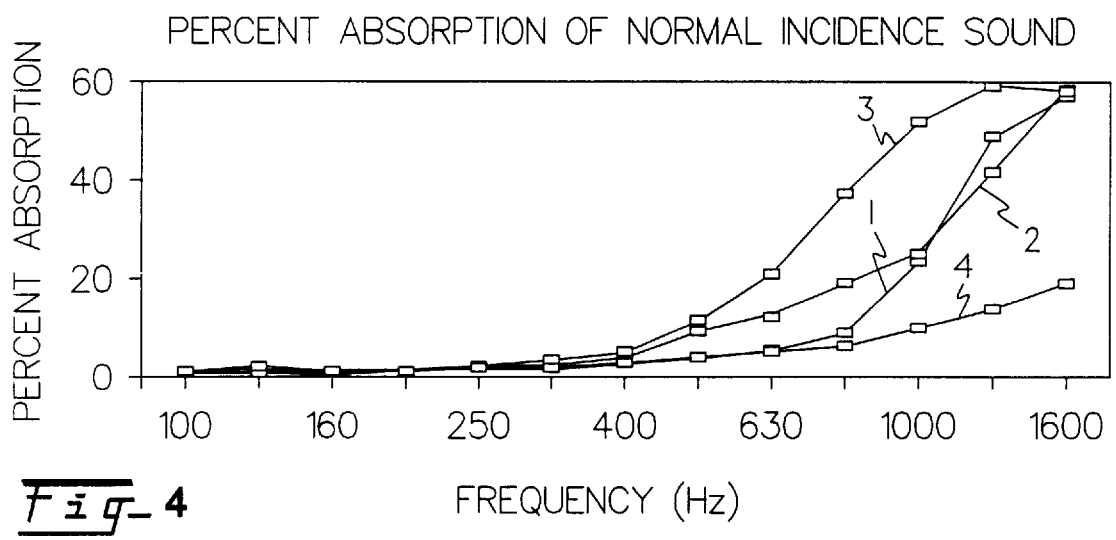
FIGS. 4 and 5 show the sound absorption rates of the present inventions.
Figure 5:
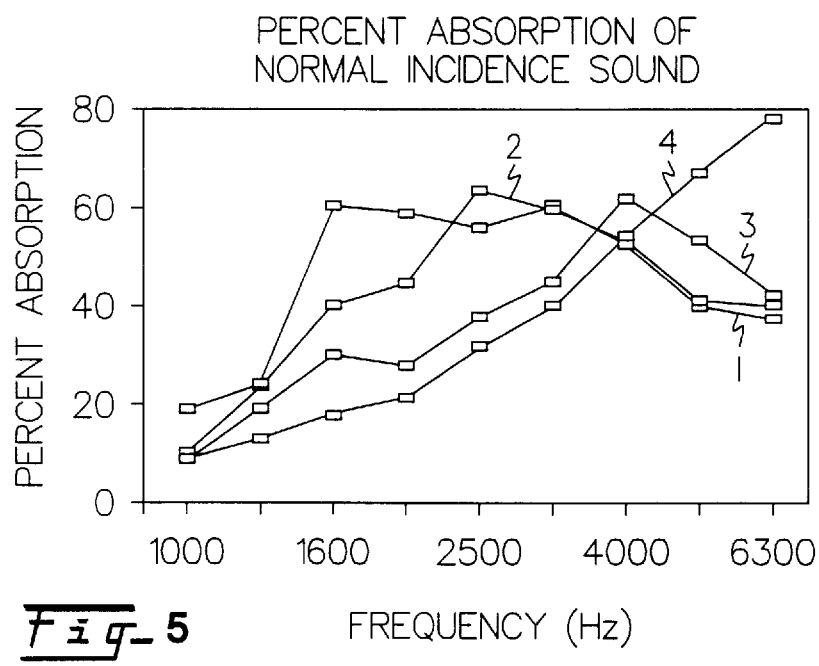

The test results show the higher absorption of sound with increase in the number of layers of cellulose fibers. The sound absorption values at each frequency are shown in Table 1 and Table 2 and represent an average of two data points. These values are also shown in graph form in FIGS. 4 and 5, respectively, in which the data for each of Examples 1, 2, 3 and 4 are represented by corresponding lines 1, 2, 3 and 4.

TABLE 1

| | % Absorption | | | |
|---|---|---|---|---|
| Frequency (Hz) | Example 1 | Example 2 | Example 3 | Example 4 |
| 100 | 0.2 | 0.6 | 0.1 | 1.9 |
| 125 | 1.4 | 1.9 | 0.6 | 3.0 |
| 160 | 0.5 | 0.8 | 0 | 2.1 |
| 200 | 1.4 | 1.7 | 1.5 | 1.9 |
| 250 | 1.8 | 2.7 | 2.7 | 2.1 |
| 315 | 2.1 | 3.2 | 4.6 | 2.4 |
| 400 | 2.4 | 4.5 | 6.8 | 3.0 |
| 500 | 3.7 | 7.8 | 11.0 | 3.9 |
| 630 | 5.4 | 11.5 | 21.1 | 4.9 |
| 800 | 10.3 | 18.0 | 36.5 | 6.5 |
| 1000 | 23.6 | 26.2 | 51.2 | 8.9 |
| 1250 | 48.5 | 42.1 | 58.5 | 12.6 |

TABLE 2

| | % Absorption | | | |
|---|---|---|---|---|
| Frequency (Hz) | Example 1 | Example 2 | Example 3 | Example 4 |
| 1000 | 8.8 | 11.3 | 18.3 | 9.1 |
| 1250 | 18.2 | 25.5 | 26.6 | 11.9 |
| 1600 | 30.6 | 40.5 | 61.0 | 15.9 |
| 2000 | 28.4 | 45.9 | 57.4 | 21.9 |
| 2500 | 36.4 | 66.8 | 54.8 | 29.9 |
| 3150 | 47.6 | 60.9 | 61.8 | 40.5 |
| 4000 | 63.5 | 52.2 | 49.7 | 54.0 |
| 5000 | 52.1 | 41.1 | 39.4 | 68.2 |
| 6300 | 43.8 | 40.1 | 34.8 | 77.2 |

The acoustical web employed in Example 1 is two layers of cellulose fiber having a total thickness of 4 mm and a total weight of 220 g/sq.yd.

The acoustical web of Example 2 is three layers of cellulose fiber having a total thickness of 6 mm and a total weight of 325 g/sq.yd.

The acoustical web of Example 3 is four layers of cellulose fiber having a total thickness of 8 mm and a total weight of 430 g/sq.yd.

The acoustical web of Example 4 is three layers comprising a core layer and two outside layers. The core layer is primarily ground cellulose fiber with a small amount of synthetic fiber having a thickness of about 6 mm and was formed in an air-laid process of the type shown in FIG. 2. The two outside layers are a top layer of 2 oz/sq.y melt-blown polypropylene and a bottom layer of 0.5 oz/sq.yd spunbond polypropylene. The web had a total weight of 395 g/sq.yd and a total thickness of about 7 mm.

It will be understood that the claims are intended to cover all changes and modifications of the preferred embodiments of the invention herein chosen for the purpose of illustration which do not constitute a departure from the spirit and scope of the invention.

What is claimed is:

1. An acoustical non-woven web comprising at least two layers, each of which two layers comprises cellulose fiber from wood pulp, said layers being bonded together with a binder, wherein the cellulose fiber is a mixture of about 95–80% by weight bleached wood pulp and about 5–20% by weight synthetic fibers blended with a low formaldehyde latex resin.

2. The acoustical web of claim 1 wherein the binder is a starch or latex binder.

3. The acoustical web of claim 1 wherein said binder further comprises fire retardant, mildew inhibitors, or water repellents.

4. The acoustical web of claim 3 wherein said binder is a starch; said fire retardant is an inorganic salt; said water repellent is a non-ionic surfactant or a wax emulsion; and said binder has a solids content of about 5% to about 14% by weight.

5. The acoustical web of claim 3 wherein said binder is a modified starch with latex, and said binder has a solids content of about 5% to about 14% by weight.

6. The acoustical web of claim 1 wherein said binder is a hot melt adhesive.

7. The acoustical web of claim 1 wherein one side of said non-woven web is coated with a barrier acoustic material of EVA, reground PVC filled with inert material, or EVA filled with silica.

8. The acoustical web of claim 1 further comprising an attachment means to affix the acoustical web to a surface.

9. The acoustical web of claim 8 therein said attachment means is a pressure sensitive adhesive, a Velcro-type attachment or a release liner.

10. The acoustical web of claim 1 further comprising a coating on one side of said non-woven web, said coating being a film, a paper, a foil, or coated Kraft paper.

11. An acoustical non-woven web comprising at least two layers, each of which two layers comprises cellulose fiber from wood pulp, said layers being bonded together with a binder, further comprising a top layer of lightweight microfiber melt-blown web and a bottom layer of spunbond web, said layers of cellulose fiber forming a core between said top and bottom layers.

12. The acoustical web of claim 11 wherein said melt-blown web weighs about 2 to about 4 oz/sq.yd and has a fiber diameter of about 5 to about 10 microns.

13. The acoustical web of claim 11 wherein said spunbond web has a weight of about 0.5 to about 1 oz/sq.yd.

14. The acoustical web of claim 11 wherein said bottom layer is made of polyethylene film having a thickness of about 1 to about 6 mm.

15. An acoustical non-woven web comprising at least two layers, each of which two layers comprises cellulose fiber from wood pulp, said layers being bonded together with a binder, wherein at lesat one of said cellulose layers is made up of a mixture of about 95–80% by weight ground up pulp fiber and about 5–20% by weight synthetic fibers made on a Rando-type air-lay machine.

16. The acoustical web of claim 15 further comprising a top and a bottom layer of cellulose tissue-type paper.

17. An acoustical non-woven web comprising at least two layers, each of which two layers comprises cellulose fiber from wood pulp, said layers being bonded together with a binder, wherein said layers further comprise a thermoplastic synthetic fiber.

18. The acoustical web of claim 17 wherein said thermoplastic synthetic fiber is a low melt polyester binder fiber or a polypropylene fiber.

* * * * *